United States Patent [19]

Anderson

[11] 3,930,645
[45] Jan. 6, 1976

[54] CEILING ARTICLE SUPPORT DEVICE

[76] Inventor: Raymond Anderson, 1513 S. Dwight Ave., Compton, Calif. 90220

[22] Filed: Nov. 11, 1974

[21] Appl. No.: 522,698

[52] U.S. Cl............... 269/289; 214/1 SW; 248/355
[51] Int. Cl.² .......................................... B25J 3/00
[58] Field of Search...... 214/1 SW; 248/355, 354 R, 248/354 L; 254/106; 269/289

[56] References Cited
UNITED STATES PATENTS

| 885,251 | 4/1908 | Csiszar | 248/355 |
|---|---|---|---|
| 2,164,609 | 7/1939 | Cusick | 248/354 |
| 2,858,094 | 10/1958 | Olson | 248/355 |
| 2,907,598 | 10/1959 | Hart | 248/355 |
| 3,131,928 | 5/1964 | Whipple | 214/1 SW X |

Primary Examiner—Al Lawrence Smith
Assistant Examiner—Robert C. Watson
Attorney, Agent, or Firm—Joseph E. Baker

[57] ABSTRACT

An elevator and support device is disclosed wherein a required adjustment may be conveniently made by a single operator without substantially disturbing his position. Devices such as disclosed in the subject invention find application in the installation of ceiling tiles and other building materials usually attached to overhead rafters and ceiling beams. Prior art devices have been cumbersome and/or complicated and expensive and most have required at least two operators in order to effectuate a fine adjustment of the holding device. The present invention provides fine adjustment capabilities requiring the attention of only one operator.

5 Claims, 4 Drawing Figures

CEILING ARTICLE SUPPORT DEVICE

BACKGROUND OF THE INVENTION

1. Field of the Invention

This invention relates generally to ceiling jacks and more particularly to ceiling jacks that may be easily adjusted by one operator.

2. Description of the Prior Art

One prior art device used for supporting ceiling material while such material was being nailed to ceiling beams describes a hand crank used to raise a platform or table upon which the ceiling tile or other material rested while being elevated into place. A cable and drum arrangement was utilized to effect vertical extension of telescoping tubular members. A pawl and ratchet arrangement was provided to maintain the required position once it was reached. Among the drawbacks of this prior art device are its complexity and its necessary cumbersomeness. It is also to be noted that its efficient operation required the presence of at least two workmen. Damage to the surface of the ceiling material often resulted due to the unsatisfactory performance of the adjusting mechanism of the device. The device was not continuously adjustable, rather, it was adjustable only to the positions defined by the pawl and ratchet mechanism.

Another prior art device provided an interconnecting group of jacks. This device is cumbersome and complex and adjustment, being effected by a ratchet arrangement, is discrete rather than continuous and therefore, less than satisfactory. In these prior art devices, even where it is possible for one operator to perform the required adjustments, the operator, if he is on a ladder, scaffold or other device placing him close to the site of the attachment of the ceiling material, must dismount and return to floor level to perform these adjustments. Upon returning to the site of attachment, i.e., the ceiling, experience teaches that often additional adjustments must be made necessitating yet another return to floor level. Such a procedure can become tedious, time consuming and therefore, expensive.

It would be of great value to the art to provide an elevator and support device, continuously adjustable from the operator's position on a ladder or scaffold where the operator might be immediately aware of the result of trial adjustments made and therefore, might correct for such adjustments without disturbing his position. It would be of additional great value if such a device could be made simple in design and construction, inexpensive to manufacture and conveniently portable.

SUMMARY OF THE INVENTION

It is an object of the present invention to provide an elevator and support for building materials that may be adjusted by one operator from a position on a ladder or scaffold.

It is a further object of the invention to furnish a ceiling jack providing a continuous adjustment feature.

It is a still further object of this invention to provide a conveniently portable, easily operable elevator and support for building materials that may be fabricated inexpensively and simply.

An adjustable elevator and support for building materials according to the invention includes a base, a vertical support member, an adjusting mechanism and its actuator and a material support member or table. The base provides floor or ground support for the mechanism and is separated from the material support member or table by the vertical support member. The vertical support member comprises at least two tubular members which may be detachably joined together.

Additional objects, advantages and characteristic features of the present invention will become readily apparent from the following detailed description of a preferred embodiment of the invention when considered in conjunction with the accompanying drawings.

DESCRIPTION OF THE PREFERRED EMBODIMENT

Figure 2:
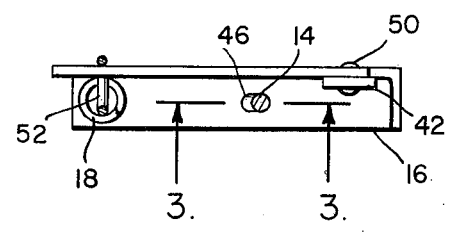
FIG. 2 is a sectional view taken along the line 2—2 of FIG. 1.
Figures 1, 4:
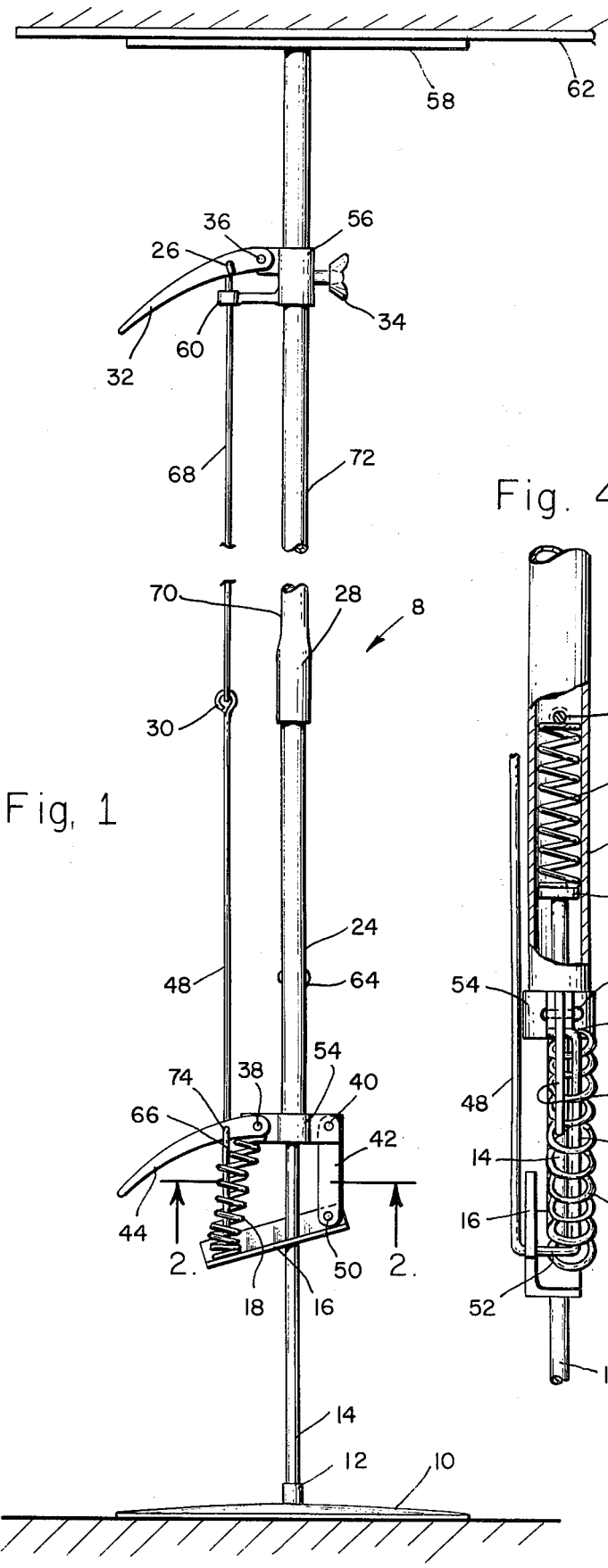
FIG. 1 is an elevational view of an elevator and support device constructed in accordance with the invention.
FIG. 4 is an enlargement of a sectional view taken along the line 4—4 of FIG. 1.
Figure 3:
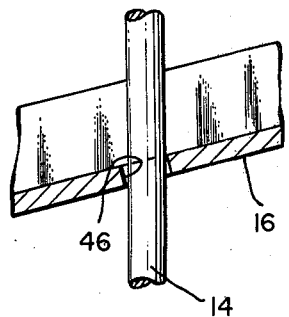
FIG. 3 is a sectional view taken along the line 3—3 of FIG. 2.

Referring to FIG. 1 with greater particularity, a ceiling article support device in accordance with the invention, designated generally at the numeral 8, may be seen to comprise a support base 10 having a receiving boss 12 for holding a first vertical support member 14. Vertical support member 14 projects through adjusting flange plate 16 at an opening 46 and continues into first vertical support tube 24 via lower adjustment bracket 54. Adjusting flange plate 16 having a hole 46, is hingeably attached to first vertical support tube 24 by means of lower adjustment bracket 54 through the interconnections of pine 38, 40, pivot pin 50 and connection 52 and connecting bracket 42. First vertical support member 14 terminates in spring retaining plug 22 which retains loading spring 20 in cooperation with retaining pin 64. Tensioning spring 18 maintains the relative vertical positions of first vertical support member 14 with respect to first vertical support tube 24 by means of the friction exerted on first vertical support member 14 by the sharp edges of the hole 46 in adjusting flange plate 16. Details of this friction clutch arrangement may be more readily apparent by reference to FIG. 2 of the drawings where the same numbers refer to the same elements of both drawings. FIG. 3 gives another view of the clutch arrangement showing the position-maintaining friction contacts between first vertical support member 14 and adjusting flange plate 16.

Tension spring 18 is maintained in its position between adjusting flange plate 16 and adjustment release handle 44 by being positioned around lower adjusting rod 66 and being retained therebetween by pin 52 and the hook 74 formed at the upper end of lower adjusting rod 66. First adjusting rod member 48 is a continuation of lower adjusting rod 66 as may be made more readily apparent by reference to FIG. 4 wherein like numbers refer to the same elements of both drawings. First adjusting rod member 48 may be connected by means of hook-and-eye arrangements 30 to as many additional upper adjusting rods such as Nth upper adjusting rod 68, as may be necessitated by the height of the ceiling involved in the work being accomplished. It may also be noted that first vertical support tube 24 may be connected by means of slide fitting arrangements 28 to a second vertical support tube 70 and thence to Nth vertical support tube 72. Again the number of vertical support tubes employed will be a function of the height dimension of the ceiling involved in the work being accomplished.

Adjusting handle 32 is maintained in its position with respect to Nth vertical support 72 through the cooperative actions of the upper adjustment bracket 56 as held in place by clamp 34. Nth upper adjusting rod member 68 attaches to adjusting handle 32 by means of hook 26. Operation of adjustment handle 32 about pivot pin 36 is accomplished by a lifting motion thus transmitting through Nth upper adjusting rod member 68, first adjusting rod member 48 and lower adjusting rod member 66, a like lifting motion to adjustment release lever 44. Lifting motion thus transmitted to adjustment release lever 44 is accomplished against tensioning spring 18 and serves to move adjusting flange 16 about pivot pin 50 so as to relieve the friction existing between first vertical support member 14 and the hole 46 thus allowing relative vertical movement between first vertical support member 14 and first vertical support tube 24. Release of adjusting handle 32 reinstates the friction between first vertical support member 14 and the sharp edges of hole 46 through the action of tensioning spring 18 causing a canted position of adjusting flange plate 16 to be assumed thus bringing the sharp edges of hole 46 into tensioned contact with first vertical support member 14. Thus any adjustment made to extend or retract first vertical support member 14 with respect to first vertical support tube 24 will also adjust ceiling article support member 58 and thus also ceiling article 62. Such adjustment will be maintained by the friction clutch arrangement already noted. It is important to note that the adjustment described is accomplished by a single operator in close proximity to the work being performed without having disturbed his position in relationship thereto.

There has thus been described a ceiling article support device including the desirable features of being simple and economical to manufacture, easily portable and operable by a single workman without changing his position in close proximity to the work being accomplished.

What is claimed is:

1. A ceiling article support device comprising in combination:

a base having a receiving boss for receiving and retaining a first vertical support member;

a second vertical support member receiving and connected with said first vertical support member;

a plurality of vertical support members one of which receives and interconnects with said second vertical support members and each of which is slideably interconnectable one to another;

a ceiling article support member supported by and fastened to one of said plurality of vertical support members;

an adjusting flange plate connected to said second vertical support member and having a hole providing friction-maintained relative vertical position of said first vertical support member with respect to said second vertical support member;

an adjusting mechanism including a first adjusting handle attached to the vertical support member that has the ceiling article support member attached thereto;

a second adjusting handle pivotally attached to said second vertical support member;

a first adjusting rod member interconnected between said first adjusting handle and said adjusting flange plate;

a second rod member interconnected between said second adjusting handle and said flange plate;

a tension spring coaxially mounted around said second rod member between said second adjusting handle and said adjusting flange plate, so as to bias said adjusting flange plate against said first vertical support member, thereby maintaining adjustable frictional contact of the flange plate against the first vertical support member.

2. A ceiling article support device as recited in claim 1 wherein said first vertical support member terminates in a spring-retaining plug and fits into a tube having a load adjustment spring.

3. The article of claim 2 wherein said slideably interconnectable vertical support members are tubes having slide fittings.

4. A ceiling article support device as recited in claim 1 wherein said adjusting flange plate has a hole, said hole having sharp edges.

5. The device of claim 1 wherein said first adjusting rod member comprises a plurality of intermediate interconnectable rods.

* * * * *